United States Patent [19]

Hanulik

[11] Patent Number: 4,828,759

[45] Date of Patent: May 9, 1989

[54] PROCESS FOR DECONTAMINATING RADIOACTIVITY CONTAMINATED METALLIC MATERIALS

[76] Inventor: Jozef Hanulik, Lerchenhalde 45, CH-8046 Zurich, Switzerland

[21] Appl. No.: 19,799

[22] PCT Filed: May 27, 1986

[86] PCT No.: PCT/CH86/00069

§ 371 Date: Jan. 28, 1987

§ 102(e) Date: Jan. 28, 1987

[87] PCT Pub. No.: WO86/07184

PCT Pub. Date: Dec. 4, 1986

[30] Foreign Application Priority Data

May 28, 1985 [CH] Switzerland .......................... 02238/85
May 28, 1985 [CH] Switzerland .......................... 02239/85
Jun. 3, 1985 [CH] Switzerland .......................... 02328/85

[51] Int. Cl.[4] .......................... G21F 9/16; G21F 9/08; C09K 13/08; B08B 9/00

[52] U.S. Cl. .......................... 252/628; 134/1; 134/3; 134/22.11; 134/22.16; 134/24; 134/27; 134/28; 204/1.5; 204/130; 204/140; 204/141.5; 252/79.3; 252/626; 252/631; 252/632; 423/2; 423/4; 423/18; 423/20

[58] Field of Search .............. 252/626, 628, 631, 632, 252/79.3; 34/1, 5, 9; 134/1, 2, 3, 8, 10, 12, 22.1, 22.11, 22.16, 22.17, 22.13, 22.18, 28, 24, 27; 423/2, 3, 11, 4, 12, 18, 20; 204/1.5, 129.75, 130, 141.5, 140, 153; 156/652, 651

[56] References Cited

U.S. PATENT DOCUMENTS 3,341,304 9/1967 Newby .......................... 423/20
3,383,183 5/1968 Grant .......................... 423/20
3,409,413 11/1968 Burns et al. .......................... 423/20
3,565,707 2/1971 Radimer et al. .......................... 156/3
3,873,362 3/1975 Mihram et al. .......................... 134/3
3,891,741 6/1975 Carlin et al. .......................... 423/2
3,965,237 6/1976 Paige .......................... 423/4
4,086,325 4/1978 Cordier et al. .......................... 252/628
4,217,192 8/1980 Lerch et al. .......................... 252/628
4,443,269 4/1984 Capella .......................... 252/626
4,500,449 2/1985 Kuhnke et al. .......................... 252/628
4,530,723 7/1985 Smeltzer et al. .......................... 252/628
4,537,666 8/1985 Murray et al. .......................... 204/129.95
4,620,947 11/1986 Carlson .......................... 252/628
4,686,019 8/1987 Ryan et al. .......................... 204/1.5
4,701,246 10/1987 Fujita et al. .......................... 204/130

FOREIGN PATENT DOCUMENTS 0073366 9/1981 European Pat. Off. .
2058766 5/1972 Fed. Rep. of Germany .
2421313 11/1974 Fed. Rep. of Germany .
2714245 4/1980 Fed. Rep. of Germany .
2333331 11/1975 France .
891670 3/1962 United Kingdom .

OTHER PUBLICATIONS

"Dekontamination eines Reaktor-Kühlwasserkreislaufs am Beispiel des Forschungsreaktors WWR-S in Rossendorf", H. Unger and D. Westphal, Kernenergie, pp. 285-290, Dec. 11, 1968.

*Primary Examiner*—Howard J. Locker
*Attorney, Agent, or Firm*—Thomas W. Speckman

[57] ABSTRACT

Contaminated surface layers are decontaminated by treatment with an aqueous fluorine base-containing decontamination solution. The aqueous decontamination solution contains 0.05 to 50 Mol of decontamination agent per liter, and the decontamination agent preferably comprises at least one substance from the group, hexafluorosilicate acid, fluoroboric acid, and the salts of both these. The decontamination solution produces the required high decontamination factors on metallic substances and brickworks as well. The used decontamination solution can, after regeneration, be recycled into the decontamination process.

Release of decontaminated material by dissolution of the surface layer of the decontaminated objects provides decontamination of objects having complicated and hard-to-measure geometries.

The decontamination agent ($HBF_4$-acid) is advantageously produced from contaminated boric acid from pressurized water reactor wastes by reaction with fluoride or hydrofluoric acid. The $HBF_4$-acid thus produced is, through distillation, separated from the contaminants and impurities.

18 Claims, 2 Drawing Sheets

PROCESS FOR DECONTAMINATING RADIOACTIVITY CONTAMINATED METALLIC MATERIALS

BACKGROUND OF THE INVENTION

1. Field of the Invention

The present invention concerns an agent for decontaminating contaminated metallic or cement-containing substances. The invention also concerns, however, a process for the production of this decontamination agent by using boric acid, which is contained in the primary cycles of pressure water reactors. The invention furthermore concerns processes for using the decontamination agent. Although the decontamination agent in accordance with the invention is not restricted to the use of radioactively contaminated materials, the primary emphasis in the following description will be laid on this application.

2. Description of the Prior Art

In the past, the contaminated surface layers of reactor cooling conduits were frequently removed by means of aqueous mineral acid solutions. One such decontamination solution, with 20% nitric acid and 3% hydrofluoric acid, is cited, for example, in "Kernenergie" 11th year, 1968, page 285. Since, because of the aggressive nature of such mineral acid solutions, the removal process can only be controlled with great difficulty, there exists the danger that the pure metal below the contaminated surface layer will be corroded, so that weak points may arise, which may lead to the formation of leaks—which must in all cases be avoided. Of all the decontamination processes later developed in order to remove such or similar defects, the best known one must be the so-called "AP-Citrox" process ("Kernenergie", 11th year, 1968, page 285), in which the contaminated surface is first treated with an oxidizing alkaline permanganate solution to prepare for dissolution, and is then treated with a reducing, aqueous solution of dibasic ammonium citrate.

In U.S. Pat. No. 3,873,362, a similar two-stage decontamination process is described, in which, during the first stage, hydrogen peroxide is preferably used for oxidation, and, during the reducing, second process stage, aqueous solutions of mixtures of mineral acids (sulfuric acid and/or nitric acid) and complex-forming substances, such as oxalic acid, citronellic acid, or formic acid, are employed.

In accordance with another known decontamination process taught in German Pat. No. DE-PS 27 14 245, the contaminated metallic surface is treated with a cerous solution containing at least one cerium-IV-salt and a water-bearing solvent. A further decontamination process is described in European Patent Application, publication No. 00 73 366, in which an aqueous solution of formic acid and/or acetic acid is used as a decontamination agent, and, as a reducing agent, formaldehyde and/or acetaldehyde is used. In this process, it is particularly advantageous that a relatively slight need for chemicals exists, and, during the removal of the used decontamination solution, a quantity of precipitated radio-active substances corresponding approximately to the volume of the surface layers removed is used.

In the wet chemical decontamination processes which have been briefly described above, the basic concept is connected with the fact that the activity in the contaminated surface layer decreases with mass, as the surface layer itself is dissolved by the decontamination solution. The penetration depth of active material into the surface layer can be determined or measured before decontamination.

Decontamination tests on various metallic reactor components have only one conflict with the statement above, that the amount of residual activity is solely a function of the thickness of the surface layer removed. For various decontamination solutions, there are provided various decontamination factors with the same gravimetrically determined abrasion of layers. Research with a scanning electron microscope has shown that solid layers or islands of solids have formed on the decontaminated metal surfaces, in which active material is concentrated, and which are as considered as undesirable by-products of the specific abrasive reactions. Such variations are particularly observed in substances which contain silicon or aluminum, and thus in stainless steels and high-temperature materials, such as, for example, are used in helium-cooled high temperature reactors, and even in slightly alloyed steels. Apart from an undesirably high residual activity, the monitoring and control of the decontamination process is, because of the irregular removal of such surface layers difficult, so that reliable decontamination is no longer ensured, and the previously stated corrosion damage has to be taken into account.

In the primary water cycle of water pressure reactors, boric acid is found in concentrations of up to 3000 ppm. During the operation of such reactors, small quantities of the stated fluid precipitate as waste. This waste contains, in addition to boric acid, further contaminants, such as, for example, cobalt compounds, as well as solid contaminants, such as, for example, rust residues, materials fibers, dust, and the like. This waste can, in certain cases, be treated to such an extent that it is present in the form of a solid material.

The waste was previously generally concentrated to approximately 16 weight % by means of evaporation, so that this concentrate then had an activity of 0.1 to 3 $Ci/m^3$ and up to 1 g/l of solids (28,000 ppm Boron). Such a concentrate may be solidified with cement (see also, for example, Nagra: (Nationale Genossenschaft zur Lagerung radioaktiver Abfalle) Technical Report, 84-09. A quantity of 123 kg of concentrate solution/200 liter matrix, with a volumetric weight of 1.89 $Mg/m^3$, that is, 123 kg (=114 liters with a density of 1.08 $Mg/m^3$) is solidified in a matrix weighing 378 kg. The quantities of concentrate can amount to up to 10 $m^3$ per nuclear plant per year. To remove this amount of concentrate, approximately 88 vessels were required, according to the above assumptions, whereby the volume of each vessel amounted to about 200 liters. With a price of Swiss 5,000.00 francs per vessel, including removal, the sum of Swiss 440,000.00 francs for the removal of the annually precipitating quantity of waste results.

SUMMARY OF THE OBJECTIVE

It is the of the present invention to propose a decontamination agent which is more economical than the previously known agent, can be obtained by using boric acid from pressure water reactors, and permits a versatile application. A decontamination agent comprising a fluoroboric acid provides improved decontamination of contaminated metallic and cement-containing materals. Fluoroboric acid decontamination agent may be produced from the reaction of boric acid products from water pressure reactors with fluorine or hydrofluoric acid. Decontamination of contaminated metallic and cement containing materials may then be achieved by contact with the fluoroboric acid decontamination agent, with subsequent separation of the decontamination agent from the contaminants and solid impurities.

DESCRIPTION OF PREFERRED EMBODIMENTS

Figure 1:
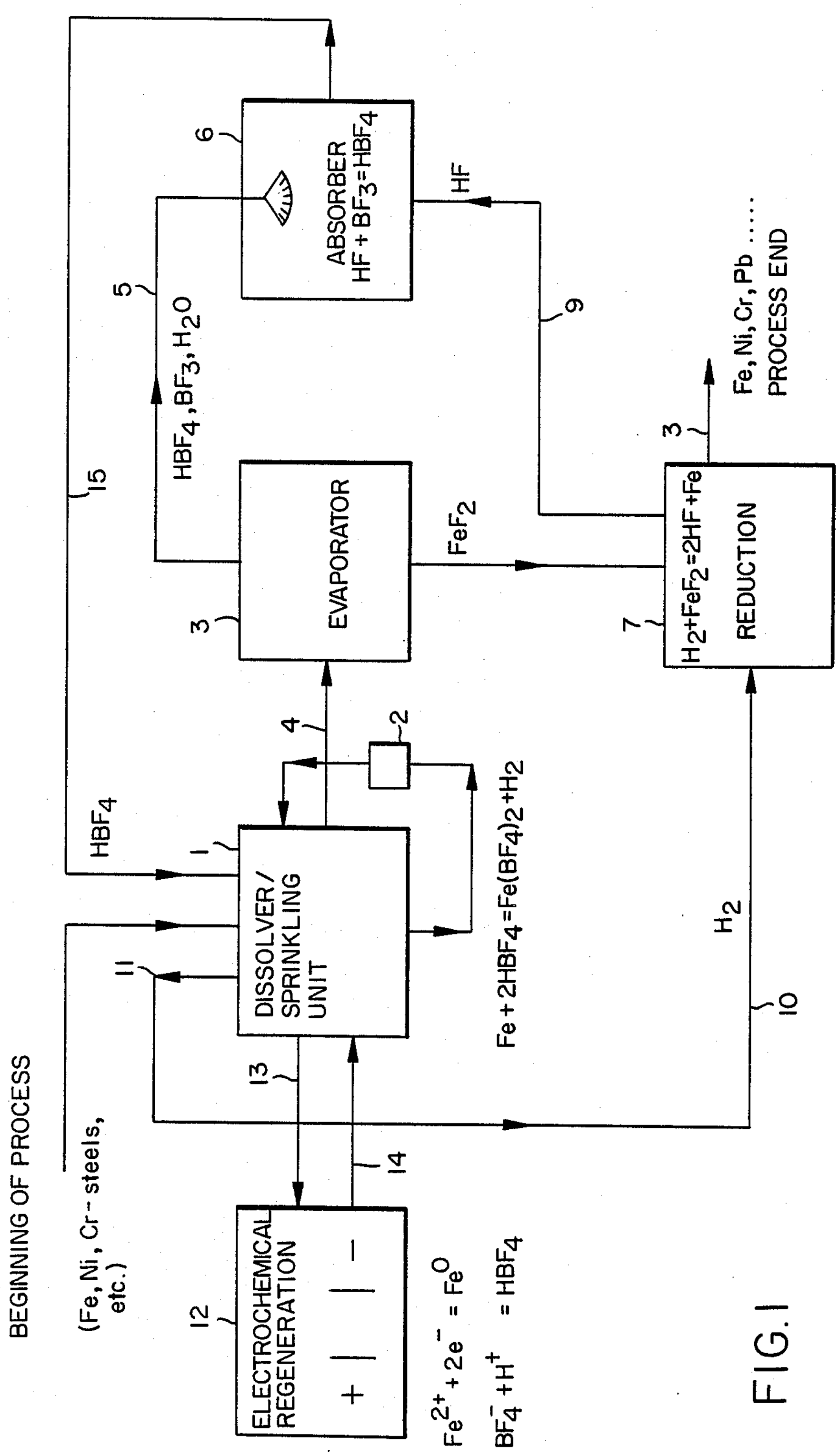
FIG. 1 shows a flow diagram for producing a decontamination agent according to one embodiment of this invention.

The device for carrying out the present process (FIG. 1) has a container for receiving the objects to be decontaminated. The length of treatment of objects in the receiving container (1) is so selected that the objects, after the termination of the process, are free from radioactivity. The decontaminated objects are then removed from the receiving container (1), and can then either be reused, or discarded with other scrap.

A decontamination solution is introduced into the receiving container (1), which solution works on the surfaces of the objects in such a manner that the contaminated surface layer is dissolved and abraded. The decontamination solution in the container (1) may be a bath, in which the objects may be immersed, or the decontamination solution may be sprayed into a container (1).

A circulating device (2) with a pump may be provided in communication the receiving container (1). This makes it possible to provided long treatment period for the objects, with a relatively small quantity of decontamination solution. An evaporating unit (3) is connected to the receiving container (1) by means of conduit (4). Within the evaporating unit (3), more volatile components of a concentrated solution are separated from less volatile components of the same. Vaporizable components are conducted to an absorber unit (6) by means of a further conduit (5). The sump products from the evaporating unit (3) may be introduced a further conduit (5). The sump products from the evaporating unit (3) may be introduced into a reduction device (7), in which they are reduced to metallic iron, chromium, nickel, lead, and the like. There also exists, however, the possibility of conducting the solid, steamed products without reduction of the same for reutilization as chemical, metallic compounds in the chemical industry, or discarding the same as scrap. The reduction device (7) is, by means of a conduit (9), connected to the absorber unit (6), through which HF is conducted from the reduction device (7) to the absorber unit (6). The hydrogen necessary for the reduction of metal compounds can be conducted from the dissolving unit (1) to the reduction device (7), through a conduit (10).

An electrolytic cell (12) can be connected with the receiving container (1) by means of a conduit (13), through which the concentrated solution is circulated from the receiving container (1) into the cell (12). During the operation of this cell (12), $BF_4^-$ ions are reacted at the anode to form $HBF_4$. $HBF_4$ is conducted to the receiving container (1) through a further conduit (14).

Inside the previously described absorber unit (6), there likewise arises $HBF_4$, which is conducted to the receiving container (1) through conduit (15). The quality of the surface of the treated objects can be influenced during and/or after the decontamination process by means of surface-active substances. As examples of such substances, we might cite, for example, soaps, water permeability inhibitors, such as formaldehyde, and the like.

The great superiority of the process described here relative to the state of the art processes concerns the nearly universal applicability of the process, the extraordinarily great reception capacity of $HBF_4$ for the materials treated, and the total regenerability of the decontamination solution, so that an extraordinarily small quantity of secondary yields arises.

Decontamination Effects (Table 1):

Experiments were carried out with materials from primary circuit of boiling water reactors and with steam-producing material from a pressure water reactor with a stronger magnetic layer. The materials had activities of approximately 10 $\mu Ci/cm^2$ Cobalt-60.

TABLE 1

| Material | Decontamination factors (−) | |
|---|---|---|
| SWR | 3 h, 80° C. | 2,5 h, 110° C. |
| Boiling water reactor | Df = 100 | Up to free limit |
| Primary circuit | | |
| Stainless steel (from KWL) | | |
| DWR pressure water reactor | 2 h, 80° C. | 45 Min., 100° C. |
| Steam producer/Inconel 600 | Df~40 | Df~30 |
| (Ni-base alloy) | | |

Corrosion Behavior (Table 2):

The abrasion kinetics of stainless steel and nickel-based alloys were investigated at 80°, 90°, and 100° C.

TABLE 2

| Abrasion Kinetics in the DECOHA Process | | |
|---|---|---|
| | Micrometer/h | |
| Temperature | 80° C. | 100° C. |
| Stainless steel | 5-6 | ~30 |
| Low-alloyed steel | ~50 | >100 |
| Nickel-base alloys | 3-4 | ca. 15 |

At the beginning of the process, dissolver unit (1) is provided, in which the objects to be decontaminated are, for the purpose of free decontamination or for free measurements, either first placed in a bath or sprayed by means of a spraying process. The second part of the process consists of evaporation in an evaporating unit (3). In the evaporating unit (3), concentrated solutions, with approximately 200 grams of stainless steel per liter, are, at high temperatures, concentrated at normal or lowered pressure, and then dried to solid $FeF_2$ or analogous fluorides of other metals.

$BF_3$, $B_2O_3.BF_3$, $HBF_4$, $H_2O$ and dehydrates of the boric acid are evaporated, suctioned off, and, in the next part of the device, the absorber unit (6), dissolved in the fluids phase. In the absorber unit (6), the solution obtained is displaced with hydrofluoric acid or with hydrofluoric acid steams, to produce fresh $HBF_4$-acid, which is conducted to the dissolver unit (1). The sump products from the evaporating unit (3) are conveyed to the reduction part (7) of the device, in which they can be reduced to metallic iron, chromium, or nickel (among others). Depending on whether free decontamination or free measurement is involved, we may obtain either inactive products from the evaporating unit (3) or from the reduction device part (7), or else active, solid products, which are conducted to removal area. The decontamination solution used for the decontamination process may be tested by means such as pH testing, and/or collorimetrical testing, and/or density testing, and/or radioactivity testing to determine the composition of the decontamination solution. Depending on the removal infrastructure which is present, several removal options may be provided.

(a) The direct removal of the decontamination agent from the dissolver unit (1);
(b) The removal of fluorides, in an evaporated form;
(c) The removal of metallic components after reduction steps;
(d) Or, combinations of the above.

Instead of immersing the objects to be decontaminated in a decontamination bath and carrying out decontamination processes over the course of several hours, or even repeatedly, it is enough to sprinkle the contaminated objects at high temperature with a shower-like device. This treatment is effective regardless of the geometry of the objects involved. Each object can be packed in a plastic casing, which serves as the container for the device. By collecting the fluid flowing off in the lowest area, the same decontamination agent can be used again by means of the pump (2) in the cycle. The minimal quantity of decontamination agent, is necessary for the maintenance of the cycle and the wetting of the system, is determined by the wetting properties of the decontamination agent and the properties of the material surfaces. From practical experience, values of between 0.5 to 1.5 liters per $m^2$ of the surface area treated have been demonstrated. The high absorption capacity of the decontamination agent or decontamination solution (1 liter can, at 90° C., dissolve up to 220 grams of stainless steel), permits very flatly constructed decontamination lines. Such a high absorption capacity permits, with only 1 liter of decontamination solution and an abrasion level of 1 micrometer, approximately 30 $m^2$ of the surface to be decontaminated. Inside the dissolver unit (1), a concentration of up to 220 grams of stainless steel per liter can be attained at 90° C. This concentrated solution is circulated in the electrolytic cell (12), where metal is separated at the cathode, while, on the anode, $BF_4^-$ ions recombine into $HBF_4$, and this is again conducted to the decontamination process.

Removal of Secondary Wastes:

As an example, an iron-containing $Fe(BF_4)_2$ concentrate will be discussed. This concentrate also contains radioactivity, which does not, however, influence the chemical balance. Dissolved stainless steel, nickel-base alloys and other contaminated materials are to be treated analogously. The following equation can be used for the direct removal of iron concentrates:

$$Fe(BF_4)_2+4Ca(OH)_2=Fe(OH)_2+4CaF_2+2H_3BO_3$$

Removal In Accordance With Electrochemical Regeneration (Minimal Variants):

Iron, chromium, nickel, or copper may be electrolytically removed from the iron-containing concentrate, and then mixed with cement. The electrolysis proceeds in accordance with the following:

$$Fe^{2+}+2e^-=Fe^o \text{ (at the cathode);}$$

$$BF_4^-+H^+=HBF_4 \text{ (at the anode).}$$

The reactions for other metals from deconaminated alloys proceed analogously. It is advantageous to use as an anode a corrosion-resistant material, such as, for example, graphite, or to use as a sacrifice anode the contaminated object itself, which accelerates the chemical dissolution and simultaneously regenerates the acid.

Removal Variations in Accordance With the Dessication of $HBF_4$-Acid:

At normal pressure, at temperatures of up to 170° C., or at reduced steam pressure and lower temperatures, there is attained, in accordance with the dessication process, solid, reddish residue of $FeF_2$ with activity. The residue yields, after the mixture with water and $Ca(OH)_2$, $CaF_2+Fe(OH)_2$. These solid products are compatible with cement, and the weight of the cement matrix can be determined in accordance with the following formula:

The number of grams of dissolved iron in the concentrate multiplied by 12.5 = weight of the cement matrix in grams. The distillate contains vapors of $HBF_4$, $BF_3$, $H_2O$, boric acid, and dehydrates of the same. After the condensation and collection of the vapors in the water, the desired concentration of $HBF_4$ can be adjusted by adding HF.

Reactions:

| | |
|---|---|
| Dissolver unit 1 | $Fe + 2\,HBF_4 \longrightarrow Fe(BF_4)_2 + H_2$ |
| Evap. unit 3 | (a) $H_2O$ distilled off |
| | (b) distilled off from unreac. $HBF_4$ |
| | (c) pyrolysis $Fe(BF_4)_2 \xrightarrow{t\,°C.} Fe\,F_2 + 2\,BF_3$ |
| | $BF_3\,(g) + B_2O_3 \longrightarrow BF_3 \cdot B_2O_3\,(g)$ |
| | $H_3BO_3$ (from $HBF_4$ hydrolysis) $\longrightarrow B_2O_3 + H_2O$ |
| Absorber 6 | $BF_3 + HF \longrightarrow HBF_4$ |
| Reduction 7 | $H_2 + Fe\,F_2 \longrightarrow 2\,HF + Fe.$ |
| | Reactions $HBF_4$ - Metals |
| Dissolver | $2\,HBF_4 + Ni = Ni(BF_4)_2 + H_2$ |
| | $3\,HBF_4 + Cr = Cr(BF_4)_3 + 3/2\,H_2$ |
| | $2\,HBF_4 + Cu = Cu(BF_4)_2 + H_2$ |
| | $2\,HBF_4 + Pb = Pb(BF_4)_2 + H_2$ |
| In general | $n\,HBF_4 + Me = Me(BF_4)_n + \frac{n}{2}\,H_2$ |
| Evaporator (Pyrolysis) | $Ni(BF_4)_2 = NiF_2 + 2\,BF_3$ |
| | $Cr(BF_4)_3 = CrF_3 + 3\,BF_3$ |
| | $Cu(BF_4)_2 = CuF_2 + 2\,BF_3$ |
| | $Pb(BF_4)_2 = PbF_2 + 2\,BF_3$ |
| Reduction | $Ni\,F_2 + H_2 = Ni + 2\,HF$ |
| | $Cr\,F_3 + \frac{3}{2}\,H_2 = Cr + 3\,HF$ |
| | $Cu\,F_2 + H_2 = Cu + 2\,HF$ |
| | $Pb\,F_2 + H_2 = PbF_2 + 2\,HF$ |

Removal with $Ca(OH)_2$ $Ni(BF_4)_2 + 4\,Ca(OH)_2 = Ni(OH)_2 + 4\,CaF_2 + 2\,H_3BO_3$
$Cr(BF_4)_3 + 6\,Ca(OH)_2 = Cr(OH)_3 + 6\,CaF_2 + 3\,H_3BO_3$
$Cu(BF_4)_2 + 4\,Ca(OH)_2 = Cu(OH)_2 + 4\,CaF_2 + 2\,H_3BO_3$
$Pb(BF_4)_2 + 4\,Ca(OH)_2 = Pb(OH)_2 + 4\,CaF_2 + 2\,H_3BO_3$
$NiF_2 + Ca(OH)_2 = CaF_2 + Ni(OH)_2$
$CrF_3 + \frac{3}{2}\,Ca(OH)_2 = Cr(OH)_3 + \frac{3}{2}\,CaF_2$
$CuF_2 + Ca(OH)_2 = CaF_2 + Cu(OH)_2$
$PbF_2 + Ca(OH)_2 = Pb(OH)_2 + CaF_2$

| | |
|---|---|
| | Reactions $H_2SiF_6$ - Metals |
| Dissolver | $Fe + 2\,H_2SiF_6 = Fe(Si\,F_6)_2 + 2\,H_2$ |
| In general | $Me + n\,H_2Si\,F_6 = Me^{n+}\,(Si\,F_6)_n + n\,H_2$ |
| Evaporator (pyrolysis) | $Fe(Si\,F_6)_2 = Fe\,F_2 + 2\,Si\,F_4$ |
| In general | $Me^{n+}(Si\,F_6)_n = Me\,F_n + n\,Si\,F_4$ |
| Absorber | $Si\,F_4 + 2\,HF = H_2Si\,F_6$ |
| Reduction | $Me^{n+}F_n + \frac{n}{2}\,H_2 = Me + n\,HF$ |

Removal with $Ca(OH)_2$ $$Fe(SiF_6)_2 + Ca(OH)_2 \xrightarrow[=]{\text{qualitative}} Fe(OH)_2 + 6\,CaF_2 + SiO_2 \cdot n\,H_2O$$

In general

-continued

| |
|---|
| $Me(SiF_6) + Ca(OH)_2 = Me(OH)_n + CaF_2 + SiO_2 \cdot H_2O$ |
| Reactions HF - Metals |

yield fluorides, the removal of which with $Ca(OH)_2$ has already been dicussed in outline form.

Decontamination of Brickwork and Cement-Containing Surfaces:

In the decontamination of porous materials, the activity is transported into the material through the mobile, fluid phase, which makes wet decontamination either more difficult or even impossible. A mechanical removal of the contaminated layer must therefore be carried out. This process is expensive, deforms the surface, and causes many secondary defects.

It is the objective of the present invention to remove the stated disadvantages of the prior art processes, as well as additional ones not discussed, in the area of decontamination. This task is achieved by a decontamination agent comprising fluoroboric acid.

Example of Application and Mechanism:

The brickwork surface is misted/moistened with $HBF_4$-and/or $H_2SiF_6$—acid. Through the chemical reaction between the carbonates in the brickwork and the acids, gaseous $CO_2$ arises. The gas bubbles form a foam with the acid, which is an outstanding flotation agent for the contaminants. The foam is subsequently suctioned off. Fluorine ions from the fluoro-complexes of the acids react with the calcium which is present, and form an insoluble, voluminous precipitate of $CaF_2$, which plugs the pores present on the surface. Through the impregnation of the brickwork described, the activity transport into the interior of the material is significantly impeded. In radium-contaminated concrete, decontamination factors of between 10 and 15 were attained during decontamination.

New Ice-Abrasive Decontamination Processing Methods:

During treatment with the decontamination solution, undesirable solid secondary reaction products may be produced which remain on the surface of the object, and which, under certain circumstances, distinctly impair the decontamination results. This layer is relatively easy to clean, as long as it has not dried out, and is crusted with the surface. After the conclusion of the previously calculated (or estimated) decontamination treatment, the entire sytem is abrasively treated with solid ice particles. The contaminated parts of the deposition layer are made mobile and may, be wiped away, and removed.

Figure 2:
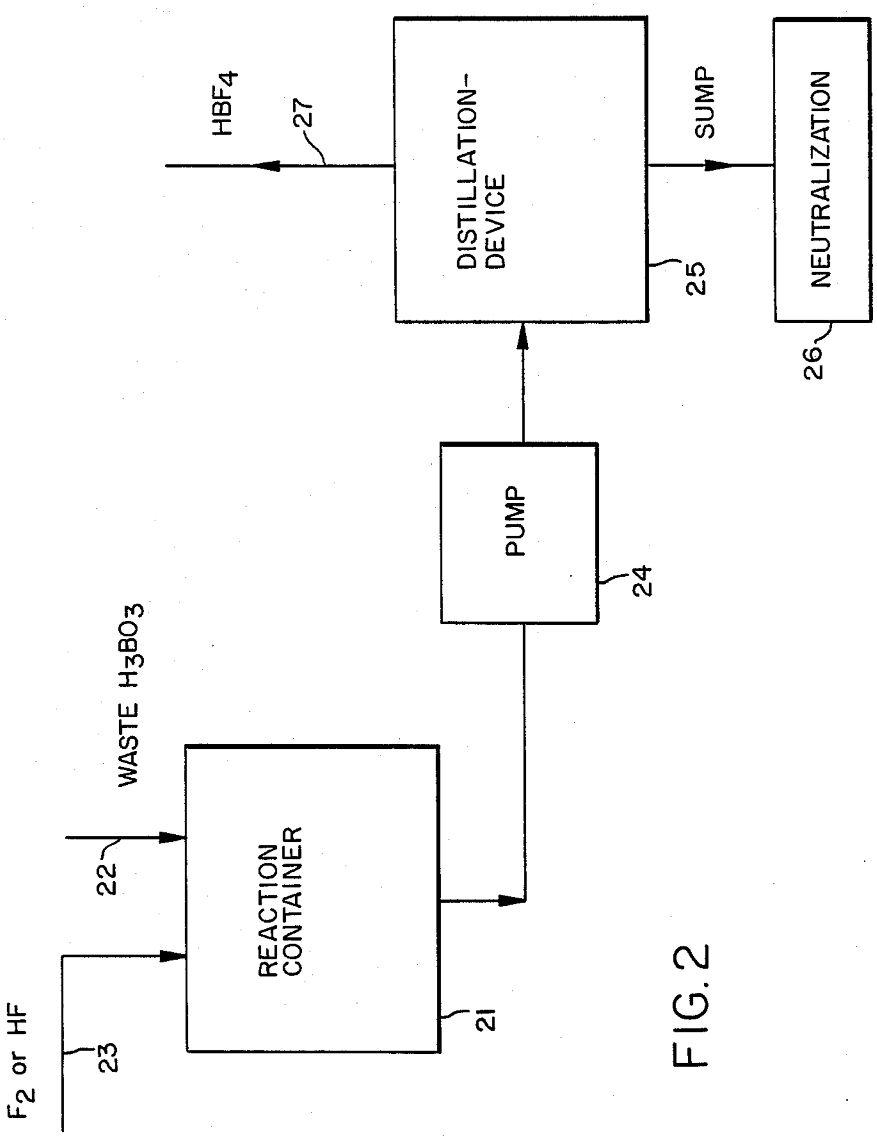
FIG. 2 shows a flow diagram for transforming contaminated boric acid into an evaporable boron compound according to one embodiment of this invention.

The device for carrying out the present process comprises a reaction container (21), in which contaminated boric acid is transformed into an easily evaporable boron compound (FIG. 2). Through a first conduit (22), contaminated boric acid is introduced into the reaction container (21). This generally involves a fluid which, in addition to boric acid, also contains water, contaminants, such as, for example, cobalt compounds, as well as contaminants, such as, for example, rust residues, materials fibers, dust, and the like. A chemical substance, which causes the stated transformation, it conducted to the reaction vessel (21) through an additional conduit (23). This may be a gaseous fluorine or hydrofluoric acid. Hydrofluoric acid can be used either in the form of a fluid or in the form of a gas.

A pump (24) is connected to the reaction container (22), which moves the reaction product from the reaction vessel (21) into a distillation device (25) of the known type. The rate of introduction of the two named components through the conduits (22 and 23) into the reaction container (21), and the rate of the removal of the reaction product from the reaction container, is so selected that enough time is allowed for completion of the stated reaction to the material transport. The sump, which remains behind in the distillation device (25), is removed and conditioned. For this purpose, the sump is first of all neutralized in a further vessel (26), for example, with calcium hydroxide. The neutralized sump material can be just simply dried again, and then removed as well. It can, however, also be reinforced with cement or bitumen, and then deposited. The heat energy necessary for distillation in the device (25) is advantageously removed in liquid or gaseous media. The distillation is advantageously carried out at low pressure, because the temperatures in the device (25) are then relatively low, and, at such temperatures, practically no pyrolysis takes place.

The $HBF_4$-acid which is separated during the distillation is removed from the distillation device (25) through conduit. This acid can be used as a completely regenerable decontamination agent, as is described in a Swiss patent application, No. 2238/85, of the same applicant, or the acid can be sold to the chemical industry, where it can, for example, be used in galvanizing techniques.

The essential advantages of the present process are to be seen in the fact that the borofluoric acid, which is separated during distillation, does not reach the final storage area for radioactive material, but is sold, for example, to the chemical industry, and thus can be used again. The sump, because it has a smaller volume, can be removed, without entailing large costs. The knowledge that borofluoric acid $HBF_4$, in contrast to $H_3BO_3$, is distillable, and can therefore be separated from the contaminants, such as, for example, Co-60 Cs-nucleides, forms the basis of the present invention. Furthermore, the borofluoric acid can be separated into fractions of various densities during distillation. The principal reactions, which are the basis of the present process, are as follows:

$$H_3BO_3 + 4HF \propto HBF_4 + 3H_2O + 14.7 \text{ kcal.}$$

In one practical case, 15.46 g of $H_3BO_3$ was added to 20 g of HF within approximately 20 minutes.

EXAMPLE

10 $m^3$ of boron-containing concentrate (16% $H_3BO_3$) contains 1600 kg of boric acid (approximately 26'000 Mol). After evaporation, the fourfold mol-surplus of HF is mixed with the boric acid (104'000 Mol HF), that is, for example, 2457 liters of 70% HF, 1 liter at Swiss francs 12.00 (=Sfr. 29,500.00). The distillate yields approximately 26'00 Mol $HBF_4$, which comes out 24,700.00 Swiss Francs (1 liter=8 Mol−50%)=Sfr. 7.6). We obtain, according to the process used, 4500 kg of approximately 57%—$HBF_4$—acid, or the corresponding dilution, according to the collected concentration of boric acid. The $HBF_4$-acid obtained must contain no traces of activity (with the classification distillation), since it can be used as fully regenerable decontamination agent for components of DWR (pressurised water reactors) and SWR (boiling water reactors). The option for an inactive application (in galvanization technology, for example), exists with the execution of a multi-stage distillation process.

I claim:

1. A process for decontaminating radioactively contaminated metallic materials using a decontamination agent selected from the group consisting of fluoroboric acid; water soluble salts of fluoroboric acid; and mixtures thereof in aqueous solution, said decontamination agent having a concentration of about 0.05 to about 50 mol/liter in said aqueous solution, said process comprising contacting radioactively contaminated objects to be decontaminated with said decontamination agent; dissolving surface layers of said radioactively contaminated objects by said contacting with said decontamination agent; and separating said decontamination agent from radioactive contaminants and impurities by distillation.

2. A process in accordance with claim 1, wherein said surface layers of said radioactively contaminated objects are dissolved by immersing said radioactively contaminated objects in said decontamination agent, and additionally comprising conditioning a sump comprising said radioactive contaminants and impurities which is obtained after said distillation for removal.

3. A process in accordance with claim 2, wherein said conditioning of said sump comprises neutralizing, drying and depositing with potassium hydroxide.

4. A process in accordance with claim 2, wherein said conditioning of said sump comprises neutralizing with potassium hydroxide, and then solidifying with cement or bitumen.

5. A process in accordance with claim 2, additionally comprising separating dissolved radioactively contaminated material from said decontamination agent during said dissolving of said surface layers; and recycling said separated decontamination agent to said decontamination process after said distillation.

6. A process in accordance with claim 2, wherein said radioactive contaminants and solid impurities are separated by chemical precipitation with hydroxides.

7. A process in accordance with claim 2, wherein solid secondary reaction products produced on the surfaces of said radioactively contaminated objects during said decontamination are mechanically removed from said surfaces of said objects.

8. A process in accordance with claim 2, additionally comprising testing said decontamination agent used for said dissolution of said surface layers of said radioactively contaminated objects to determine the composition of said decontamination agent.

9. A process in accordance with claim 6, additionally comprising electrochemically separating dissolved metals from said decontamination agent and removing said dissolved metals and the precipitate separated from said used decontamination agent when the radioactive contamination of said dissolved metals and said precipitate exceeds a predetermined value.

10. A process in accordance with claim 9, wherein said chemical precipitation with hydroxides comprises adding $Ca^{2+}$ ions to said used decontamination agent in the form of $Ca(OH)_2$ to precipitate said radioactive contaminants and solid impurities, and separated precipitate is conditioned by solidifying with a cement to remove said radioactive contaminants and solid impurities from said used decontamination agent.

11. A process in accordance with claim 9, additionally comprising adding cations to said decontamination agent after said separation of said radioactive contaminants and solid impurities to convert said decontamination agent to a compound which is substantially insoluble in water.

12. A process in accordance with claim 2, wherein said used decontamination agent is distilled to drying and said sump product is pyrolyzed.

13. A process in accordance with claim 12, additionally comprising reacting said pyrolyzed sump product with hydrogen to produce metals and HF, and recycling said HF into a distillation device.

14. A process in accordance with claim 1 wherein said surface layers of said radioactively contaminated objects are dissolved by spraying said radioactively contaminated objects with said decontamination agent.

15. A process in accordance with claim 2 additionally comprising separating said decontamination agent from said contaminants and said solid impurities by electrochemical means.

16. A process in accordance with claim 7 wherein said mechanical removal comprises abrasively treating said surfaces with solid ice particles.

17. A process in accordance with claim 7 wherein said mechanical removal comprises abrasively treating said surfaces by brushing.

18. A process in accordance with claim 1, wherein said decontamination agent containing the radioactive contaminants and impurities is used as an electrolyte for transforming a pre-transformed geometry of materials into a transformed geometry of said materials which is easily measured and electrolytically produced.

* * * * *